Feb. 22, 1955 G. ELLIOTT ET AL 2,702,831

RINGING CONTROL CIRCUIT FOR TELEPHONE SYSTEMS

Filed Jan. 2, 1953 3 Sheets-Sheet 1

*INVENTORS*
GEORGE ELLIOTT
WILLIAM W. PHARIS
*BY* Francis E Blake
ATTORNEY

RINGING CONTROL CIRCUIT FOR TELEPHONE SYSTEMS

Filed Jan. 2, 1953 3 Sheets-Sheet 2

INVENTORS
GEORGE ELLIOTT
WILLIAM W. PHARIS
BY
Francis E Blake
ATTORNEY

RINGING CONTROL CIRCUIT FOR TELEPHONE SYSTEMS

Filed Jan. 2, 1953 3 Sheets-Sheet 3

INVENTORS
GEORGE ELLIOTT
BY WILLIAM W. PHARIS
Francis E. Blake
ATTORNEY

United States Patent Office 2,702,831

Patented Feb. 22, 1955

2,702,831

RINGING CONTROL CIRCUIT FOR TELEPHONE SYSTEMS

George Elliott and William W. Pharis, Rochester, N. Y., assignors to Stromberg-Carlson Company, a corporation of New York Application January 2, 1953, Serial No. 329,242

4 Claims. (Cl. 179—17)

This invention relates to dial telephone systems, and more particularly to the control of the application of ringing current to a party line in a dial telephone system.

Dial telephone systems providing party line operation are well known. In some of such systems, calls to a particular party on a party line are identified by a characteristic ringing signal such as a coded signal in which the identifying code may be the number of rings in quick succession in a ringing cycle. In other systems, characteristic different frequency selective ringers are connected to the party line at each party station and a different frequency of ringing current is applied to the line in order to ring the desired called party. In order to determine and select the characteristic ringing signal, the connectors of some systems are provided with a directively stepped switch responsive to impulses of the last dialed party identifying digit. The disadvantage of such an arrangement is that a party on the line may not retain the same number in the event that he moves to a new location and is of necessity connected to a different party line. To enable a party to have the same number regardless of what party line is used, a so-called terminal per station party line connector has been used. In the terminal per station arrangement, the first and second stepped positions of the connector and the line terminals selected thereby determine the character of the ringing so that a party may be connected within the exchange by jumpers from the connector terminals to any party line, provided that the characteristic ringing for such party is different than the characteristic ringing for other parties on the party line.

Various arrangements for characterizing the ringing to different parties on a party line connected to a terminal per station connector have been devised. Considerations of importance are that the number of different ringing current frequencies to be used should be not excessive and preferably not more than five; that the frequency selective ringers should be bridged across the line for better line balance; and that code ringing, if used, should not make the ringing cycle excessively long and yet should provide a reasonable length of ringing interval.

It is therefore a principal object of the present invention to provide a dial telephone system having an improved terminal per station party line connector and ringing control circuit to enable the use of a plurality of frequency selective ringers to be bridged across the line, with at least two of the ringers responding to the same frequency of ringing current in order to reduce the number of required frequencies of ringing current, and with a one and two ring code being used to distinguish calls to the parties having the same frequency of ringing current.

In circuits of this type, the application of ringing current more than once to the conductors of a called line during the time period of the complete ringing cycle may result in a ringing cycle of excessive time length, or in a reduction of the length of time the ringing current is connected at each application. Neither the excessively long interval between the ringing current applications nor the shortening of each application of ringing current is desirable from a telephone user's standpoint.

It is a further object of our invention to decrease the said timing interval for the complete ringing cycle and also to increase the time of each ringing current application.

In practicing the invention, for party lines having bridged frequency selective ringers for each party on a party line, a pair of conductors is connected to a terminal per station connector and in a conventional system these conductors may be common to and connected similarly in parallel to a plurality of terminal per station connectors. A ringing generator circuit is arranged to connect a plurality of sources of different frequencies of ringing current to one of the pair of conductors individually in spaced time sequence during a single ringing cycle. The generator circuit is also arranged to connect the same plurality of sources of different frequencies of ringing current to the other conductor individually in spaced time sequence during a ringing cycle, but at a different time with respect to the connection of the same frequency of ringing current to the one conductor such that an interval of time equal to the desired interval between one and two code rings is provided between the connection of the same frequency of ringing current to first one and then the other conductor. A ringing application control circuit including one of the selectively connected terminals of the terminal per station connector is arranged to connect the one conductor of the pair of conductors or both the one and the other of the conductors to the directively selected and connected party line in timed relation to the connection of a predetermined frequency of ringing current to the pairs of conductors thus determining the frequency of ringing current and the coded number of ringing current applications to the party line for a ringing cycle in accordance with the particular group of terminals selected by the directive operation of the terminal per station connector.

Another object of the present invention is to provide an improved and simplified ringing application control circuit for use in determining and timing the connection of one or both of the two ringing current conductors to a terminal per station party line connector in accordance with the directively stepped position of the connector as described above.

Further objects, features and the attending advantages of the invention will be apparent with reference to the following specification and drawings in which;

Fig. 2 is placed to the right of Fig. 1;

Figure 1:
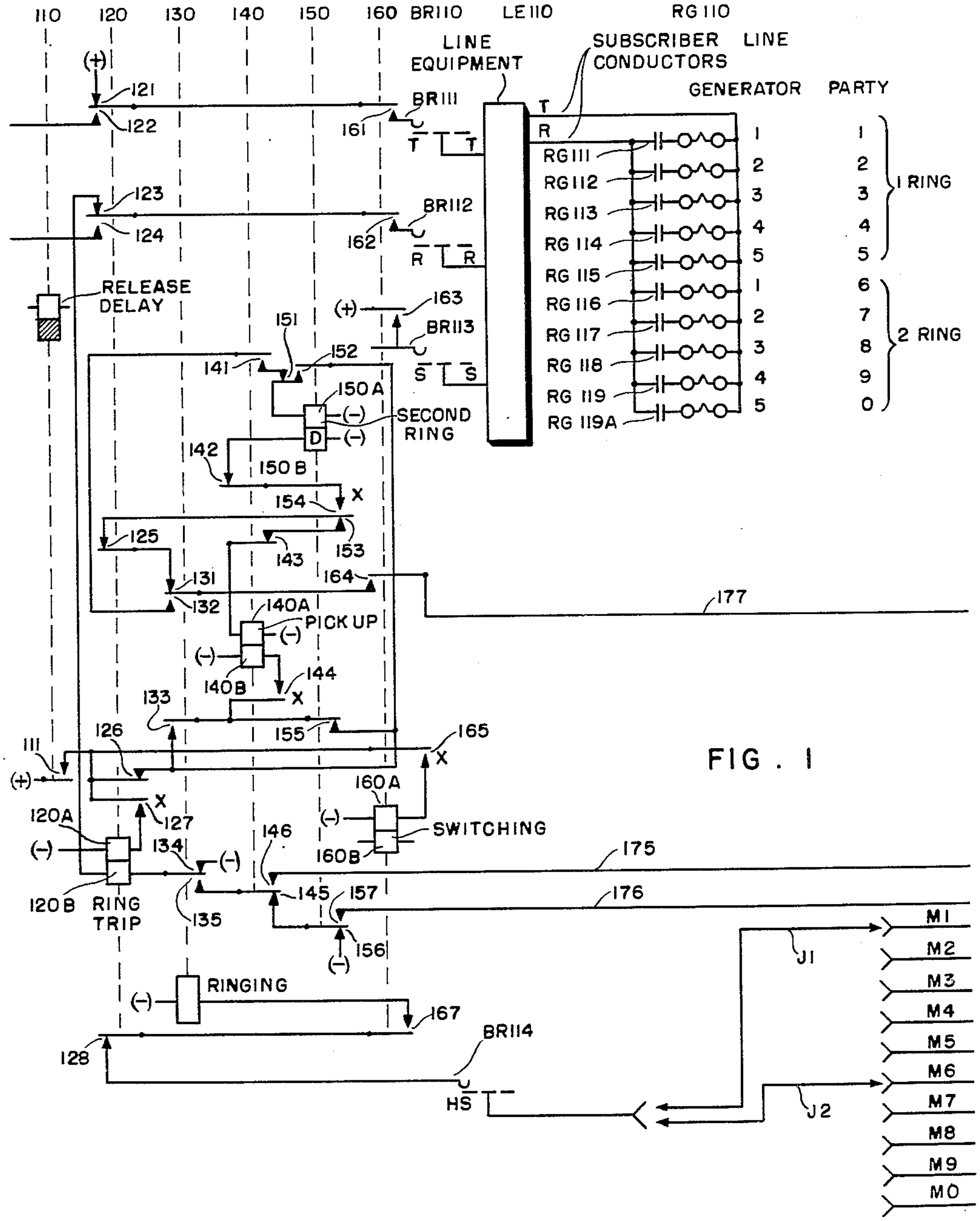
Fig. 1 is a partial schematic of a terminal per station party line connector having directively selected groups of terminals including tip, ring sleeve and hunt sleeve terminals.

Fig. 1 shows the essential portions of a terminal per station connector circuit embodying the invention. The remainder of the connector circuit (not shown) is entirely conventional and any similar connector switch circuit known in the art may be utilized. The frequency selective ringers generally shown at RG110 are also of any conventional type and are bridged across the party line in a manner to permit the audible operation of only two ringers for each application of ringing current from a particular generator characteristic frequency. Thus, generator 1 (shown in Fig. 2) will operate ringers RG111 and RG116 in unison, generator 1 providing for one ring of both ringers RG111 and RG116, or two rings of both ringers RG111 and RG116 depending upon the party to be rung on the party line as determined by the directively selected terminals of the connector in the manner to be described.

On a call from a local party or from an operator, the release delay relay 110 will be operated as is conventional and the connector switch will be directively operated to idle line equipment LE110, and the switching relay 160 will operate through its winding 160B in a manner well known in the art. Relay 160, upon operating, will complete a holding circuit for itself from ground (+) through operated contacts 111, preliminarily operated X contacts 165, and through winding 160A to battery (—). All contacts designated X in the drawings operate before other contacts of the same relay start to move. The line equipment designated LE110 includes connections whereby a plurality of different groups of connector bank terminals may be connected in parallel to the tip and ring conductors T and R of a party line to thus provide terminal per station party line operation as is well known.

Operation of the switching relay 160 closes ground through contacts 163 to the sleeve conductor brush BR113, and through bank contact S to the line equipment LE110, to prevent the connection of another similar call to the same line equipment, and to operate the cutoff relay in the line circuit to free the line conductors for the subsequent ringing and talking procedures. Operation of relay 160 also connects battery through normally closed contacts 134, winding 120B of ring trip relay 120, normally closed contacts 123, operated contacts 162, ring conductor brush BR112, bank contact R, to line conductor R. Line conductor T is connected through bank contact T, tip conductor brush BR111, operated contacts 161, and normally closed contacts 121 to ground. Ring trip relay 120 does not operate at this time as the said ringers RG110 bridged across the line conductors T and R are an open direct current circuit due to the capacitors in each ringer circuit. If, however, any one of the ten parties should now remove the receiver or handset of the telephone instrument to thereby close the called line direct current circuit, the ring trip relay 120 would operate over the circuit path previously described.

Figure 2:
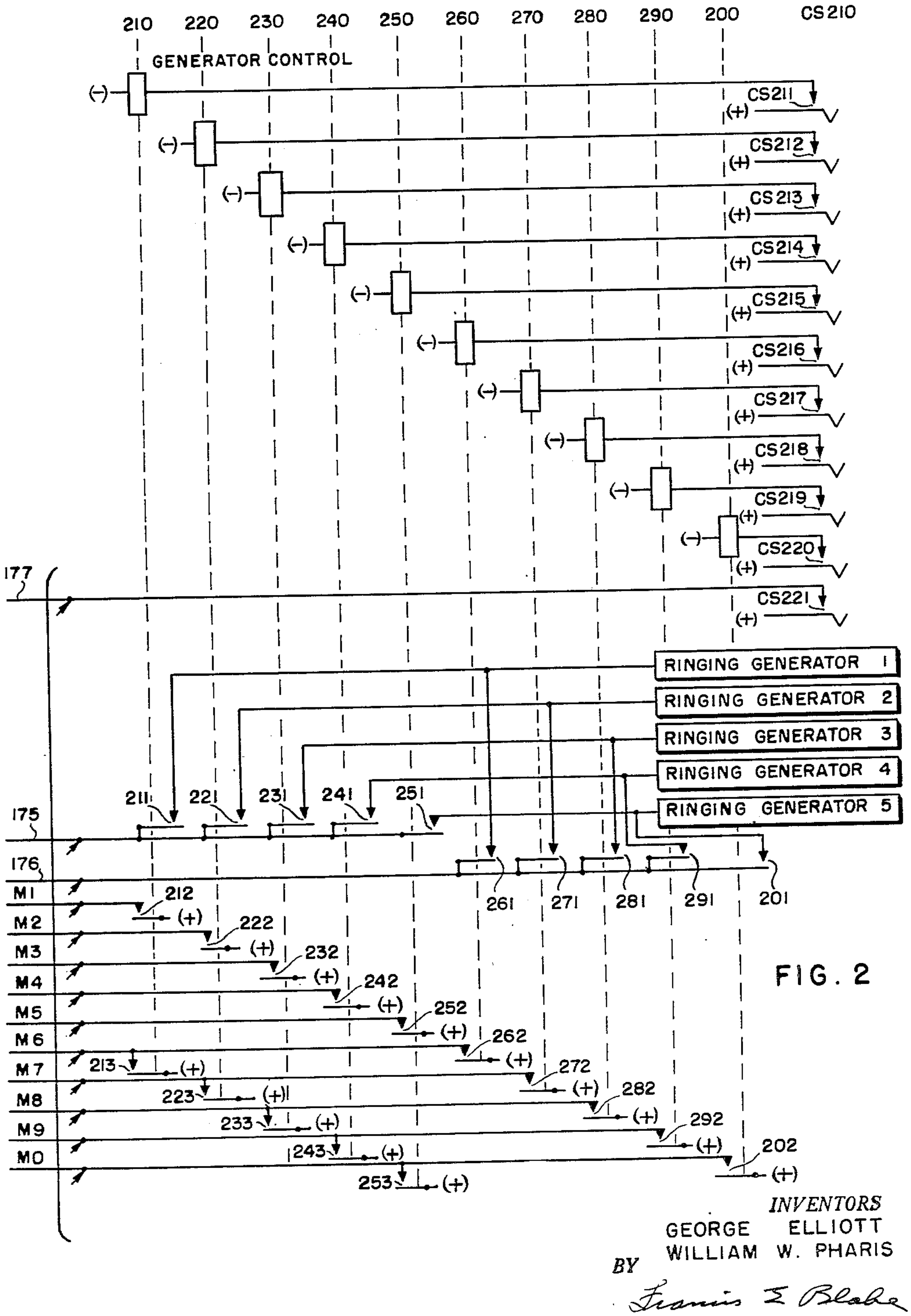
Fig. 2 is a schematic of a ringing generator circuit for common connection with one or more terminal per station connectors such as the one shown in Fig. 1 when
Figure 3:
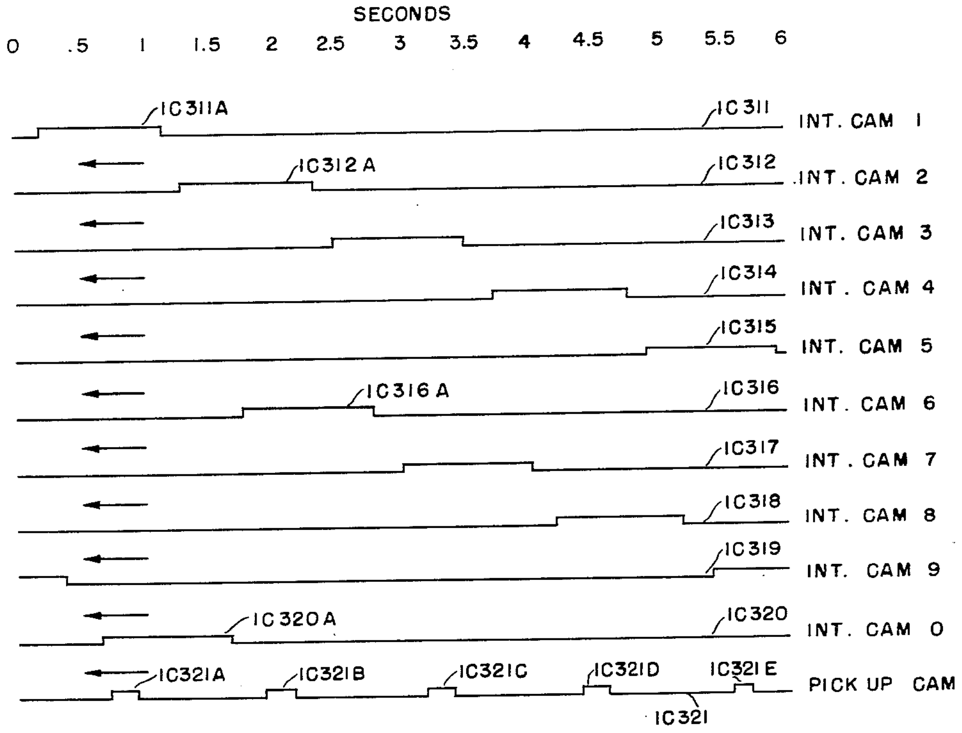
Fig. 3 is a timing chart showing the cam profiles of the interrupter cams controlling the closing of the cam spring contacts and therefore the operation of the ringing generator and control relays in Fig. 2 in a given ringing cycle of six seconds duration.
Figure 4:
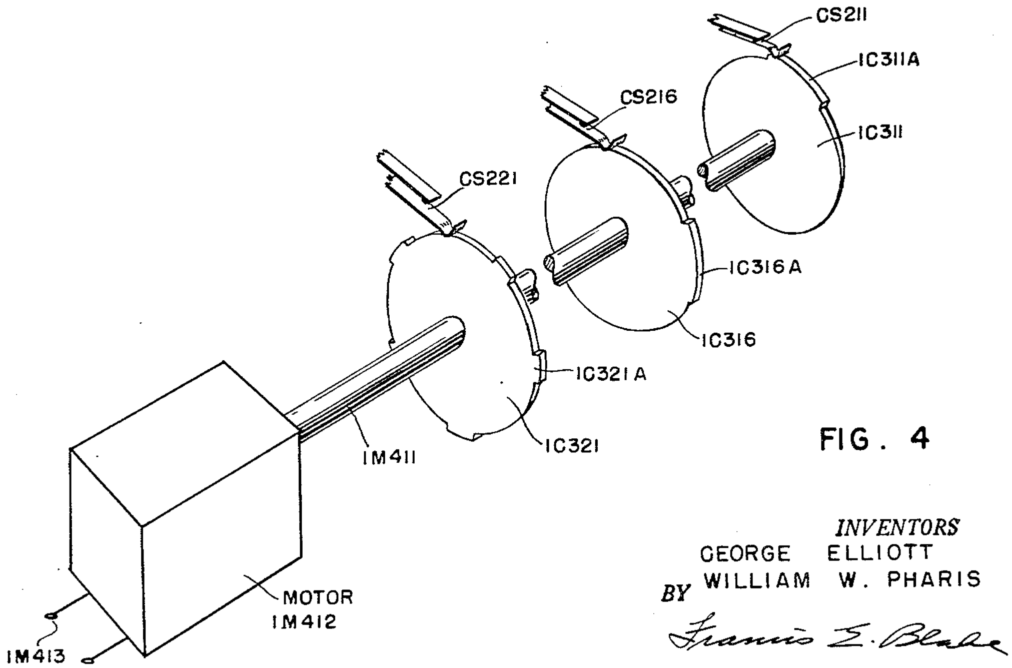
Fig. 4 is a perspective detail showing the mechanical arrangement of interrupter cams.

The group of cam springs generally shown at CS210 in Fig. 2 are operated, at varying times, by respective ones of the interrupter cams, IC311—IC321, such as the one designated IC311 shown in detail in Fig. 4 and having the cam profile IC311A also shown in Fig. 3. These cams, one for each cam spring contact combination, are mounted on an interrupter shaft IM411 which is continuously rotated in a counterclockwise direction at a rate of one complete revolution every six seconds, or at another arbitrary rate as desired, by an interrupter motor IM412 energized from a suitable power source IM413. This interrupter machine and its components are entirely conventional and are well known to one skilled in the art. On each interrupter cam is a raised portion, such as shown at IC311A to be of an arbitrary length, which closes the associated cam spring contacts CS211 correspondingly during each revolution of the said cam. In Fig. 3, the profile of each cam has been shown superimposed on a timing chart corresponding to one cycle of cam revolution in six seconds which is determined to be the duration of a single ringing cycle. The periodic closure of the various cam spring contacts CS211 through CS221 during the rotation of the interrupter cams energizes various relays correspondingly, to connect the various ringing generator sources, Gen 1 to Gen 5, to the called line, as will be subsequently described in detail. The pickup cam IC321 is shown as having a plurality of cam surfaces IC321A to IC321E which move successively into position to operate cam spring contacts CS221 as the interruputer shaft IM411 continues to rotate.

It will be noted that the first ringing generator conductor 175 is connected succesively to ringing current generators 1 to 5 during each ringing cycle of rotation of the cam shaft IM411 by the operation of relays 210—250 through their respective contacts 211, 221, 231, 241 and 251. Similarly the second ringing generator conductor 176 is connected successively to ringing current generators 1 to 5 by the serial operation of ringing relays 260—290 and 200 including contacts 261, 271, 281, 291 and 201 such that the connection of ringing generators 1 to 5 to conductor 176 is spaced in time during each ringing cycle with respect to the connection of similar ones of ringing generators 1–5 to conductor 175 by a time interval equal to the desired interval between code two rings. An example of this spacing may be shown by the time spacing between cam profiles IC311A and IC316A (Fig. 3).

The hunt sleeve bank contact terminal HS of the connector is shown (Fig. 1) as being connected either by a typical marking jumper wiring J1 to provide for one ring by generator 1 in a ringing cycle, or by another typical marking jumper wiring J2 to provide for two rings by generator 1 in a ringing cycle. It will be obvious that only one jumper is connected from a given connector HS terminal to a predetermined one of the common leads M1 to M0 and that the M-lead to which the jumper is connected will determine which frequency of generator current and ringing code that the connector will apply to the line. Thus the jumpers provide for the use of any other one or two ring generator current.

Assuming that no party on the called line has previously answered, and the ring trip relay 120 is not operated; as the interrupter shaft IM411 continues to rotate from the assumed starting point as shown to the extreme left of Fig. 3, cam springs CS211 will operate to energize ringing generator control relay 210 which will in turn energize the connector ringing relay 130 from ground through operated contacts 212, marking jumper wiring J1 connected between common lead M1 and bank contact HS, brush BR114, normally closed contacts 128, operated contacts 167, and through winding of ringing relay to battery. The operation of the ringing relay 130 at this time does not connect ringing current to the called line as the pickup relay 140 will not be operated due to its operating circuit being open at operated contacts 131 of ringing relay 130. The battery normally on conductor R, as previously described, remains thereon through normally closed contacts 145 and 156.

Ringing generator control relays 200 and 220 are now successively operated and restored as the interrupter shaft continues its rotation to cause cam surfaces IC320A and IC312A to operate cam spring contacts CS220 and CS212. Ringing generator control relay 260 will next be operated when the interrupter shaft moves to close cam springs CS216. When jumper connection J1 is used, the connector circuit ringing relay 130 will not again be energized from ground until ringing generator control relay 210 is reoperated in a successive ringing cycle.

If a two ring code of generator one frequency is desired for calling the party identified by the directively selected terminals of the connector, jumper connection J2 to common lead M6 would be used in place of jumper connection J1 and the connector ringing relay 130 would be operated twice through operated contacts 213 and 262 and through the previously described circuit path. With either jumper connection J1 or J2, the pickup relay will not yet be energized as its operating circuit is open at operated contacts 131. In other words, the pickup relay 140 does not operate until the interrupter shaft has advanced beyond the cam springs which provide the complete one or two ring application of generator current in a single ringing cycle such as, for example, the one ring application of generator 1 when jumper J1 is used, or two ring application of generator 1 when jumper J2 is used, and therefore the connection of a shortened ringing current period to the called line is prevented. As the interrupter shaft continues to rotate, ringing generator control relay 230 and ringing generator control relay 270 are successively operated and restored. It should be obvious that the operation of these relays will not energize the ringing relay 130 unless the typical marking jumper such as J1 or J2 is connected to common leads M3, M7 or M8 to obtain the desired ringing current frequency and code selection. Relays 240, 250, 280, 290 and 200 will also be successively operated and restored also with no effective ringing application to the called line unless the appropriate jumper connection is used. In commercial use, each of the common leads M1 to M0 would be connected to multipled jumpers to provide the desired ringing current for the various parties on each subscriber's line.

Again referring to an example of the use of jumper J1 to provide one ring of generator 1 frequency, as the interrupter shaft continues to rotate when cam springs CS221 are closed by cam surface IC321B, the pickup relay 140 is energized from ground through contacts CS221, pickup pulse conductor 177, operated contacts 164 of switching relay 160, normally closed contacts 131 of now restored ringing relay 130, normal contacts 125, 153 and 143, and through winding 140A to battery. Relay 140, upon operating, closes a holding circuit for itself from ground through operated contacts 111, normally closed contacts 126, 155, preliminarily operated X contacts 144, and through winding 140B to battery.

The interrupter shaft continues to rotate and ringing generator control relay 210 eventually reoperates in the succeeding ringing cycle, as previously described. With the pickup relay 140 now operated, operation of relay 210 reenergizes the connector circuit ringing relay 130 as previously described, and connects generator 1 through operated contacts 211 and the first ringing generator conductor 175, through operated contacts 146 and 135, and through the previously described path to the ringers RG110. It should be mentioned at this time that the periodic operation of ringing generator control relays 200—290, in response to the rotation of the interrupter cams IC310, results in the successive timed application of ringing current from generators 1–5 to both the first ringing generator conductor 175 and the second ringing generator conductor 176. However, the application of ringing current from a particular ringing current generator to conductor 176 is delayed in time with respect to the application of ringing current from a similar ringing generator to conductor 175 by a time interval equal to the desired interval between ringing periods for a two code ring in a single ringing cycle. It will also be noted that the pickup pulse conductor 177 is periodically energized by the closure of cam spring contacts CS221 to provide at least two spaced pickup pulses occurring in the time interval between the completion of one or two code ringing current applications in one ringing cycle and their reapplication in the next succeeding ringing cycle.

During the application of ringing current from generator 1 while relays 130 and 210 are operated, cam springs CS221 will again be closed by cam surface IC321A to energize the second ring differentially wound relay 150 from ground through operated contacts CS221, conductor 177, operated contacts 164, 132 and 141, normally closed contacts 151, and through winding 150A to battery. Relay 150, upon operating, closes a holding circuit for itself from ground through operated contacts 111, normally closed contacts 126, operated contacts 152, and through winding 150A to battery. When ringing relay 130 restores at the completion of the first ringing application in the ringing cycle, the pickup relay 140 also restores due to its holding circuit being open at normal contacts 133 or operated contacts 155. With the pickup relay 140 restored, a circuit is completed so that, when the pickup ground pulse is again connected to conductor 177 through cam springs CS221 operated by cam surface IC321B as the interrupter shaft rotates, winding 150B of second ring relay 150 will be energized from ground through operated contacts 164, normally closed contacts 131 and 125, preliminarily operated X contacts 154, normally closed contacts 142, and through winding 150B to battery. As winding 150A was also energized previously, the magnetic fluxes due to the currents flowing in windings 150A and 150B are arranged to be of equal force in the opposite direction so that relay 150 is thereby restored to its normal condition. The pickup relay 140 then immediately reoperates, as previously described, from the same pickup pulse ground on conductor 177 from cam springs CS221, to prepare for the subsequent ringing cycles of one ring generator 1 current applications each time relay 210 reoperates during the subsequent interrupter ringing cycles.

If, instead of using jumper connection J1, the marking jumper J2 from the connector bank terminal HS is connected to the common lead M6, two ring code applications of generator 1 in a given ringing cycle, with a suitable timing interval between the code applications, will be connected to the called line when relay 210 operates to energize the ringing relay 130 from ground through operated contacts 213 and when relay 260 operates to again energize ringing relay 130 from ground through operated contacts 262. As previously described, the second ring relay 150 has been operated during the first ringing period when ringing generator control relay 210 is energized and at the end of the first ringing period both ringing relay 130 and pickup relay 140 restore. When ringing generator control relay 260 operates and ringing relay 130 reoperates through contacts 262 to connect the second ringing period to the called line, the previously described circuit for restoring the second ring relay 150 is now open at contacts 131 so that the second ringing application will be completed by the closing of contacts 261 for connecting ringing generator 1 to conductor 176. The ringing current path is then through operated contacts 261, conductor 176, operated contacts 157, normal contacts 145 and operated contacts 135 to the ring trip relay coil 120B and the party line, as previously described. When the cam springs CS221 are again operated by cam surface IC321C after the completion of the second ringing application in the given ringing cycle, the second ring relay 150 will be restored by neutralizing the magnetic flux due to opposing currents in its two windings, as previously described, and the pickup relay 140 will again be operated so that the succeeding two applications of generator 1 in succeeding ringing cycles will continue to be applied in the same manner, as previously described.

The application of either one or two generator ringing periods will continue until the calling party abandons the call or until the signaled party answers the call, either between or during the ringing periods, thereby operating the ring trip relay 120 through its winding 120B and holding through its winding 120A from ground through operated contacts 111 and 127, both in the well known manner. Operation of relay 120 opens the ground path for ringing relay 130 at contacts 128 and also for the pickup relay 140 at contacts 125. Operation of the ring trip relay 120 also connects the calling and called parties together at contacts 122 and 124 for transmission purposes in the well known manner.

At the completion of the conversation, the release by the calling line causes release delay relay 110 to restore to open the holding ground at contacts 111, and to restore the connector switch in the well known manner, ready for a succeeding call.

While there has been shown and described a particular embodiment of the invention, it will be obvious to those skilled in the art that changes and modifications may be made without departing from the invention in its broader aspects. We, therefore, aim in the appended claims to cover all such changes and modifications as fall within the true spirit and scope of our invention.

What we claim is:

1. In a dial telephone system, a connector having a plurality of different groups of connector terminals to be directively selected in response to dial impulses, each of said groups of terminals including a pair of talking conductor terminals, means to connect the talking conductor terminals of a plurality of different groups of connector terminals in parallel to a party line, a first conductor, a plurality of different frequency sources of ringing current, a rotatable cam shaft, means to rotate said shaft, a first plurality of cam operated switch means including cams on said shaft for connecting each of said plurality of different frequency sources of ringing current to said first conductor in timed sequence within recurring ringing cycles, a second conductor, a second plurality of cam operated switch means including other cams on said shaft for connecting each of said plurality of different frequency sources of ringing current to said second conductor in timed sequence within recurring ringing cycles, the said cams on said shaft being so related to each other that the successive connection of said frequency sources to said second conductor in a given recurring ringing cycle is differently timed with respect to the successive connection of said frequency sources to said first conductor in the same recurring ringing cycle to provide a time interval between the connection of similar frequency sources to said conductors equal to at least the minimum code interval between ringing current applications to a called line in a given ringing cycle, a ringing relay, first jumper means adapted to be connected to one of the directively selected terminals of said connector and including a predetermined one of said first plurality of cam operated switch means for operating and releasing said relay at a predetermined time during a ringing cycle of rotation of said cam shaft corresponding to the connection of a predetermined frequency of ringing current source to said first conductor, second jumper means adapted to be connected to one of the directively selected terminals of said connector and including predetermined ones of both said first and second plurality of cam operated switch means for intermittently operating and releasing said relay at two predetermined times during a ringing cycle corresponding to connection of a predetermined frequency of ringing current source to said first and second conductors, only one of said first and second jumper means being connected to a given directively selected terminal of said connector, means to connect said first conductor to one of the directively selected talking conductor terminals of said connector through operated contacts of said ringing relay, and means to connect said second conductor to one of the directively selected talking conductor terminals of said connector through operated contacts of said ringing relay whereby the frequency of ringing current and number of applications of ringing current in a given ringing cycle to a party line may be selectively determined by the directive operation of said connector and the connection of either said first or second jumper means to the directively selected terminal of the connector.

2. In a dial telephone system, a connector having a plurality of different groups of connector terminals to be directively selected in response to the impulses of first and second digits, each of said groups of terminals including tip, ring, sleeve and hunt sleeve terminals, means to connect the tip and ring terminals of a plurality of different groups of connector terminals in parallel to a party line, a first conductor, a plurality of different frequency sources of ringing current, a rotatable cam shaft, means to rotate said shaft, a first plurality of cam operated switch means including cams on said shaft for connecting each of said plurality of different frequency sources of ringing current to said first conductor in timed sequence within recurring ringing cycles, a second conductor, a second plurality of cam operated switch means including other cams on said shaft for connecting each of said plurality of different frequency sources of ringing current to said second conductor in timed sequence within recurring ringing cycles, the said cams on said shaft being so related to each other that the successive connection of said frequency sources to said second conductor in a given recurring ringing cycle is differently timed with respect to the successive connection of said frequency sources to said first conductor in the same recurring ringing cycle to provide a time interval between the connection of similar frequency sources to said conductors equal to at least the minimum code interval between ringing current applications to a called line in a given ringing cycle, a ringing relay, first jumper means adapted to be connected to the directively selected hunt sleeve terminal of said connector and including a predetermined one of said first plurality of cam operated switch means for operating and releasing said relay at a predetermined time during a ringing cycle of rotation of said cam shaft corresponding to the connection of a predetermined frequency of ringing current source to said first conductor, second jumper means adapted to be connected to the directively selected hunt sleeve terminal of said connector and including predetermined ones of both said first and second plurality of cam operated switch means for intermittently operating and releasing said relay at two predetermined times during a ringing cycle corresponding to connection of a predetermined frequency of ringing current source to said first and second conductors, only one of said first and second jumper means being connected to a given hunt sleeve terminal of said connector, means to connect said first conductor to one of the directively selected tip and ring terminals of said connector through operated contacts of said ringing relay, and means to connect said second conductor to one of the directively selected tip and ring terminals of said connector through operated contacts of said ringing relay whereby the frequency of ringing current and number of applications of ringing current in a given ringing cycle to a party line may be selectively determined by the directive operation of said connector and the connection of either said first or second jumper means to the hunt sleeve terminal of the connector.

3. In a dial telephone system, a connector having a plurality of different groups of connector terminals to be directively selected in response to dial impulses, each of said groups of terminals including a pair of talking conductor terminals, means to connect the talking conductor terminals of a plurality of different groups of connector terminals in parallel to a party line, a first conductor, a plurality of different frequency sources of ringing current, a rotatable cam shaft, means to rotate said shaft, a first plurality of cam operated switch means including cams on said shaft for connecting each of said plurality of different frequency sources of ringing current to said first conductor in timed sequence within recurring ringing cycles. a second conductor, a second plurality of cam operated switch means including other cams on said shaft for connecting each of said plurality of different frequency sources of ringing current to said second conductor in timed sequence within recurring ringing cycles, the said cams on said shaft being so related to each other that the connection of said frequency sources to said second conductor in a given recurring ringing cycle is differently timed with respect to the connection of said frequency sources to said first conductor in the same recurring ringing cycle to provide a time interval between successive connections of similar frequency sources to said conductors equal to at least the minimum code interval between ringing current applications to a called line in a given ringing cycle, a third conductor, third cam switch means operated by said cam shaft to connect a plurality of spaced voltage pulses to said third conductor such that at least one voltage pulse is applied in spaced time succession following each connection of said different frequency sources to said first and second conductors within recurring ringing cycles, the arrangement of said third cam switch means also providing that the connection of each of said voltage pulses occurs during a period of connection of any one of said sources to said first and second conductors, a first ringing relay, a second ringing relay having first and second differentially wound windings, first jumper means adapted to be connected to one of the directively selected terminals of said connector and including a predetermined one of said first plurality of cam operated switch means for operating and releasing said first relay at a predetermined time during a ringing cycle of rotation of said cam shaft corresponding to the connection of a predetermined frequency of ringing current source to said first conductor, second jumper means adapted to be connected to one of the directively selected terminals of said connector and including predetermined ones of said first and second plurality of cam operated switch means for intermittently operating and releasing said first relay at two successive predetermined times during a ringing cycle corresponding to connection of a predetermined frequency of ringing current source to said first and second conductors, only one of said first and second jumper means being connected to a given hunt sleeve terminal of said connector, a third pickup relay, means including normal contacts of said first and second relays to connect said third relay to be operated by one of the timed voltage pulses connected to said third conductor, a first holding circuit for said third relay including operated contacts of said first relay, a second holding circuit for said third relay including normal contacts of said second relay, means including operated contacts of said first and third relays to connect said first conductor to one of the directively selected talking conductor terminals of said connector, means including operated contacts of said first and third relays for connecting the first differential winding of said second relay to the voltage pulses connected to said third conductor to thereby operate said second relay, a holding circuit for said first differential winding, the first and second holding circuits for said third relay being interrupted while said second relay is maintained operated and said first relay is restored to thereby restore said third relay, means including operated contacts of said first and second relays and normal contacts of said third relay to connect said second conductor to one of the directively selected talking conductor terminals of said connector, and means including normal contacts of said first and operated contacts of said second relays to connect said second differential winding to the timed voltage pulses connected to said third conductor to thereby restore said second relay by one of the voltage pulses connected to said third conductor whereby the frequency of ringing current and number of applications of ringing current in a given ringing cycle to a party line may be selectively determined by the directive operation of said connector and the connection of either said first or second jumper means to the directively selected terminal of the connector.

4. In a dial telephone system, a connector having a plurality of different groups of connector terminals to be directively selected in response to dial impulses, each of said groups of terminals including tip, ring, sleeve and hunt sleeve terminals, means to connect the tip and ring terminals of a plurality of different groups of connector terminals in parallel to a party line, a first conductor, a plurality of different frequency sources of ringing current, a rotatable cam shaft, means to rotate said shaft, a first plurality of cam operated switch means including cams on said shaft for connecting each of said plurality of different frequency sources of ringing current to said first conductor in timed sequence within recurring ringing cycles, a second conductor, a second plurality of cam operated switch means including other cams on said shaft for connecting each of said plurality of different frequency sources of ringing current to said second conductor in timed sequence within recurring ringing cycles, the said cams on said shaft being so related to each other that the connection of said frequency sources to said second conductor in a given recurring ringing cycle is differently timed with respect to the connection of said frequency sources to said first conductor in the same recurring ringing cycle to provide a time interval between successive connections of similar frequency sources to said conductors equal to at least the minimum code interval between ringing current applications to a called line in a given ringing cycle, a third conductor, third cam switch means operated by said cam shaft to connect a plurality of spaced voltage pulses to said third conductor such that at least one voltage pulse is applied in spaced time succession following each connection of said different frequency sources to said first and second conductors within recurring ringing cycles, the arrangement of said third cam switch means also providing that the connection of each of said voltage pulses occurs during a period of connection of any one of said sources to said first and second conductors, a first ringing relay, a second ringing relay having first and second differentially wound windings, first jumper means adapted to be connected to the directively selected hunt sleeve terminal of said connector and including a predetermined one of said first plurality of cam operated switch means for operating and releasing said first relay at a predetermined time during a ringing cycle of rotation of said cam shaft corresponding to the connection of a predetermined frequency of ringing current source to said first conductor, second jumper means adapted to be connected to the directively selected hunt sleeve terminal of said connector and including predetermined ones of said first and second plurality of cam operated switch means for intermittently operating and releasing said first relay at two successive predetermined times during a ringing cycle corresponding to connection of a predetermined frequency of ringing current source to said first and second conductors, only one of said first and second jumper means being connected to a given hunt sleeve terminal of said connector, a third pickup relay, means including normal contacts of said first and second relays to connect said third relay to be operated by one of the timed voltage pulses connected to said third conductor, a first holding circuit for said third relay including operated contacts of said first relay, a second holding circuit for said third relay including normal contacts of said second relay, means including operated contacts of said first and third relays to connect said first conductor to one of the directively selected tip and ring terminals of said connector, means including operated contacts of said first and third relays for connecting the first differential winding of said second relay to the voltage pulses connected to said third conductor to thereby operate said second relay, a holding circuit for said first differential winding, the first and second holding circuits for said third relay being interrupted while said second relay is maintained operated and said first relay is restored to thereby restore said third relay, means including operated contacts of said first and second relays and normal contacts of said third relay to connect said second conductor to one of the directively selected tip and ring terminals of said connector, and means including normal contacts of said first and operated contacts of said second relays to connect said second differential winding to the timed voltage pulses connected to said third conductor to thereby restore said second relay by one of the voltage pulses connected to said third conductor whereby the frequency of ringing current and number of applications of ringing current in a given ringing cycle to a party line may be selectively determined by the directive operation of said connector and the connection of either said first or second jumper means to the hunt sleeve terminal of the connector.

References Cited in the file of this patent

UNITED STATES PATENTS

| | | |
|---|---|---|
| 2,490,054 | Hatton | Dec. 6, 1949 |
| 2,535,675 | Goddard | Dec. 26, 1950 |